(12) United States Patent
Prell et al.

(10) Patent No.: US 11,066,587 B2
(45) Date of Patent: Jul. 20, 2021

(54) SEALANT MATERIAL

(71) Applicant: Henkel IP & Holding GmbH, Duesseldorf (DE)

(72) Inventors: Anna Prell, Heidelberg (DE); Eadaoin Ledwidge, Dublin (DE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/643,796

(22) Filed: Jul. 7, 2017

(65) Prior Publication Data
US 2017/0306203 A1    Oct. 26, 2017

Related U.S. Application Data

(63) Continuation of application No. PCT/EP2015/080683, filed on Dec. 18, 2015.

(30) Foreign Application Priority Data

Jan. 16, 2015 (GB) ................................ 1500754

(51) Int. Cl.
*C09K 3/10*    (2006.01)
*F16L 15/04*    (2006.01)
(Continued)

(52) U.S. Cl.
CPC ............. *C09K 3/1028* (2013.01); *C09D 5/34* (2013.01); *C09K 3/10* (2013.01);
(Continued)

(58) Field of Classification Search
CPC ..... F16L 15/001; F16L 15/003; F16L 15/006; F16L 15/008; F16L 15/04; F16L 15/182;
(Continued)

(56) References Cited

U.S. PATENT DOCUMENTS 2,550,944 A    5/1951  Stack
2,929,541 A    3/1960  Castelli et al.
(Continued)

FOREIGN PATENT DOCUMENTS

CN    1092459    10/2002
CN    1127774    11/2003
(Continued)

OTHER PUBLICATIONS

International Search Report issued in connection with International Patent Application No. PCT/EP2015/080683 dated Apr. 4, 2016.
(Continued)

*Primary Examiner* — Nicholas L Foster
(74) *Attorney, Agent, or Firm* — Steven C. Bauman

(57) ABSTRACT

Use of a sealing material which is a multifilament or spun yarn coated with a joint sealing composition to seal a joint in a pipe system in which system a fluid having corrosion inhibitors such as diammonium dimolybdate or benzotriazole; and/or sludge removers; and/or an alcohol such as propane diol, or ethylene glycol; and/or a hydrocarbon such as diesel, including biodiesel, fuel oil, or hydraulic oil; and/or steam at a temperature of at least 180° C. and a pressure of at least 10 bar (1000 kPa); is to be passed through the sealed joint. It is surprising that the sealing materials of the invention can maintain a sealed joint despite exposure to such materials.

6 Claims, 1 Drawing Sheet

(51) Int. Cl.
*C09D 5/34* (2006.01)
*D06M 13/144* (2006.01)

(52) U.S. Cl.
CPC ............... *C09K 2200/0447* (2013.01); *C09K 2200/0695* (2013.01); *D06M 13/144* (2013.01); *F16L 15/04* (2013.01)

(58) Field of Classification Search
CPC ............... F16L 58/182; C09K 3/1028; C09K 2200/0695
See application file for complete search history.

(56) References Cited

U.S. PATENT DOCUMENTS

| | | | |
|---|---|---|---|
| 3,587,840 A | 6/1971 | Hultberg | |
| 3,612,427 A | 10/1971 | Bishop et al. | |
| 4,031,955 A * | 6/1977 | Ledet | E21B 41/02 166/183 |
| 4,372,279 A * | 2/1983 | Parks | F16L 53/38 123/557 |
| 4,502,364 A * | 3/1985 | Zucker | D02G 3/185 227/125 |
| 4,582,196 A | 4/1986 | Hughson | |
| 4,606,134 A | 8/1986 | Flick | |
| 4,796,783 A | 1/1989 | Paulson | |
| 4,844,373 A | 4/1989 | Fike, Sr. | |
| 4,934,523 A | 6/1990 | Strom | |
| 4,958,733 A | 9/1990 | Masuda | |
| 4,994,303 A | 2/1991 | Calkins | |
| 5,068,265 A | 11/1991 | Casey et al. | |
| 5,172,841 A | 12/1992 | Friedman | |
| 5,263,585 A | 11/1993 | Lawhon | |
| 5,282,563 A | 2/1994 | Oliver et al. | |
| 5,299,723 A | 4/1994 | Hempel | |
| 5,398,975 A | 3/1995 | Simmons | |
| 5,407,071 A | 4/1995 | Lawhon | |
| 5,490,722 A | 2/1996 | Sonnett et al. | |
| 5,560,377 A | 10/1996 | Donovan | |
| 5,606,134 A | 2/1997 | Strieber | |
| 5,607,050 A | 3/1997 | Dolan et al. | |
| 5,649,659 A | 7/1997 | Saunders | |
| 5,765,740 A | 6/1998 | Ferguson | |
| 5,806,666 A | 9/1998 | Chiang et al. | |
| 6,034,002 A | 3/2000 | Maderek | |
| 6,051,314 A | 4/2000 | Girgis | |
| 6,078,824 A | 6/2000 | Sogo | |
| 6,012,050 A | 8/2000 | Marcon | |
| 6,547,177 B2 * | 4/2003 | Fitzpatrick | B65H 49/08 242/439.1 |
| 6,713,217 B2 | 3/2004 | Oura et al. | |
| 7,168,707 B2 * | 1/2007 | Casey | B65H 49/08 277/314 |
| 7,624,990 B2 * | 12/2009 | Scholer | C09D 5/34 277/314 |
| 8,069,914 B2 * | 12/2011 | Groves | E21B 43/124 166/105 |
| 8,534,353 B2 * | 9/2013 | Groves | E21B 43/124 166/249 |
| 2001/0010344 A1 * | 8/2001 | Fitzpatrick | B65H 49/08 242/439.3 |
| 2001/0044486 A1 | 11/2001 | Wesch | |
| 2002/0190481 A1 * | 12/2002 | Casey | B65H 49/08 277/602 |
| 2004/0036287 A1 * | 2/2004 | Trivelli | F16L 15/003 285/333 |
| 2004/0070154 A1 * | 4/2004 | Casey | B65H 49/08 277/602 |
| 2006/0276349 A1 * | 12/2006 | Scholer | C09D 5/34 508/110 |
| 2009/0090503 A1 * | 4/2009 | Groves | E21B 43/003 166/249 |
| 2012/0043076 A1 * | 2/2012 | Groves | E21B 28/00 166/249 |
| 2013/0048295 A1 * | 2/2013 | Beynet | E21B 33/064 166/341 |
| 2014/0014328 A1 * | 1/2014 | Groves | E21B 43/003 166/249 |
| 2014/0102699 A1 * | 4/2014 | Pober | E21B 21/002 166/267 |
| 2017/0306202 A1 * | 10/2017 | Prell | C09K 3/1012 |

FOREIGN PATENT DOCUMENTS

| | | |
|---|---|---|
| DE | 254915 | 1/1989 |
| DE | 102009046200 | 5/2011 |
| EP | 0 010 293 | 4/1980 |
| EP | 0399682 | 11/1990 |
| EP | 0646672 | 4/1995 |
| EP | 1122202 | 8/2001 |
| EP | 1 647 511 | 4/2006 |
| JP | S52028548 | 3/1977 |
| JP | 2001280506 | 10/2001 |
| JP | 2003183626 | 7/2003 |
| JP | 2006233398 | 9/2006 |
| JP | 2007016173 | 1/2007 |
| JP | 2009298919 | 12/2009 |
| WO | 9218578 | 10/1992 |
| WO | 9616800 | 6/1996 |
| WO | 98/47805 | 10/1998 |
| WO | 01/36537 | 5/2001 |
| WO | 0153424 | 7/2001 |
| WO | 2006/110679 | 10/2006 |

OTHER PUBLICATIONS

German Standard, "Sealing Material for Gas and Water Supply: Non-hardening Sealing Material for Metallic Thread Joints in Interior Installations", DIN 30 660 (1982).

"Silopren Technical Data Sheets", MatWeb material property data, Retrieved from the Internet: URL:http://www.matweb.com/search/GetMatlsByTradename.aspx? tn=Silopren%e2%84%a2 [retrieved on Mar. 8, 2019].

"Momentive Performance Materials Silopren Electro 242-0 Electrically Insulating Liquid Silicone Rubber", MatWeb material property data, Retrieved from the Internet: URL:https://web.archive.org/web/20150930191317/http://www.matweb.com/search/datasheettext.aspx?matguid=a27e7300d4934c0c8be0c1f878eab125 [retrieved on Mar. 8, 2019].

* cited by examiner

SEALANT MATERIAL

FIELD

The present invention relates to sealant material. Of interest are sealant materials useful for sealing joints. Joints to be sealed include those joining conduits for fluids. For example the joints may be pipe joints. The invention is useful in the plumbing industry. Of particular interest are materials for sealing threaded pipe joints.

BRIEF DESCRIPTION OF RELATED TECHNOLOGY

Materials for sealing pipe joints are known. For example International Patent Publication No. WO 98/47805 describes a yarn material which is impregnated with a coating material. LOCTITE® 55 is a product sold based on the technology described therein. While such materials are very useful, there are onerous applications and/or environmental conditions where such products are not utilised. In particular such products are considered not suitable for certain applications. Typically the materials are used only for plumbing applications which are low pressure and which pipe water.

European Patent Publication EP 1 647 511 describes a wire with a polymer core which is coated with cross-linked silicone rubber. European Patent Publication EP 0 010 293 describes a composition suitable for pipe jointing which has PTFE fibres, fluorinated ethylene-propylene resins, polyethylene or polypropylene and a carrier. International Patent Publication No. WO 2006/110679 describes a sealant composition which has a liquid component and a solid component. Specified engineering fibres are provided within the composition in an amount of 0.5 to 2% by weight of the total composition.

SUMMARY OF THE INVENTION

In one aspect, the present invention provides use of a sealing material comprising a multifilament or spun yarn coated with a joint sealing composition to seal a joint in a pipe system.

In the system a fluid comprising corrosion inhibitors such as diammonium dimolybdate or benzotriazole; and/or sludge removers such as petroleum jelly materials; and/or an alcohol such as propane diol, or ethylene glycol; and/or a hydrocarbon such as diesel, including biodiesel, fuel oil, or hydraulic oil; and/or steam at a temperature of at least 180° C. and a pressure of at least 10 bar (1000 kPa); is to be passed through the sealed joint.

Sealing materials of the invention were surprisingly shown to be resistant to the conditions/materials because it is conventional thinking that such sealant materials should not conventionally be used for such applications. It is surprising that the sealing materials of the invention can maintain a sealed joint despite exposure to such materials.

This is particularly true where the fluid is at an elevated temperature such as at least about 150° C. The temperature could be at least about 160° C. for example at least about 170° C. such as at least about 180° C.

The joint could also be experiencing elevated pressure such as at least about 2 bar such as at least about 4 bar for example at least about 5 bar.

The multifilament or spun yarn may be constructed from a material selected from the group consisting of: polyamide or polypropylene.

The joint sealing composition suitably comprises an oil and a filler.

The oil may be a linseed oil, a silicone oil or a mineral oil.

The filler may include one or more of a mineral filler (such as calcium carbonate), powdered polymer filler (such as polyethylene powder or polytetrafluoroethylene powder) or chopped fibre filler material (such as chopped aramid fibres, polyethylene fibres or carbon fibres).

The invention also relates to use of a multifilament or spun yarn together with a joint sealing composition in the manufacture of a sealing material for sealing a joint in a pipe system in which system a fluid comprising: corrosion inhibitors such as diammonium dimolybdate or benzotriazole; and/or sludge removers such as petroleum jelly materials; and/or an alcohol such as propane diol, or ethylene glycol; and/or a hydrocarbon such as diesel, including biodiesel, fuel oil, or hydraulic oil; and/or steam at a temperature of at least 180° C. and a pressure of at least 10 bar (1000 kPa); is to be passed through the sealed joint. In the invention the multifilament or spun yarn is coated with the joint sealing composition.

The invention also relates to a system through which a fluid passes, the system comprising a pipe system in which there is at least one joint, the joint being sealed with a sealing material comprising a multifilament or spun yarn coated with a joint sealing composition, and a fluid passing through the sealed joint, the fluid comprising: corrosion inhibitors such as diammonium dimolybdate or benzotriazole; and/or sludge removers such as petroleum jelly materials; and/or an alcohol such as propane diol, or ethylene glycol; and/or a hydrocarbon such as diesel, including biodiesel, fuel oil, or hydraulic oil; and/or steam at a temperature of at least 180° C. and a pressure of at least 10 bar (1000 kPa). Desirably the fluid is an alcohol (such as propane diol or ethylene glycol,) or steam. In the invention the multifilament or spun yarn is coated with the joint sealing composition.

The invention extends to a sealant material substantially as described herein with reference to the detailed description below; joints sealed by that material and systems incorporating such sealed joints.

It will be appreciated that all of the joint sealing compositions of the present invention are non-curable compositions. Furthermore it will be appreciated that all of the joint sealing compositions of the present invention do not have fibres dispersed within a carrier. All of the compositions of the invention are multifilament or spun yarns to which a joint sealing composition is applied.

It will be appreciated that all aspects of the invention set out above can be combined in any way.

DETAILED DESCRIPTION

Sealing materials in accordance with the invention were made and tested on assemblies as set out below.

Sealing Material:

The materials tested were as follows:

| Name | Material/Composition |
|---|---|
| Yarn | Polyamide 6,6 |
| Coating ("paste") | 28% PDMS |
| | 5% talcum |
| | 64% Calcium Carbonate (inorganic filler) |
| | 1.5% Poylethene |
| | 1.5% Teflon ™ |

Two yarns were combined together by placing them side-by-side and drawing them through a batch of the paste. (The paste was used to hold them together as they were not twisted or spliced together in anyway.)

The paste used in each instance was made as per components listed in the table above.

The emerging wet yarn was wound off onto rolls until a weight of approx 0.5-0.8 g/m of yarn was achieved.

Figure 1:
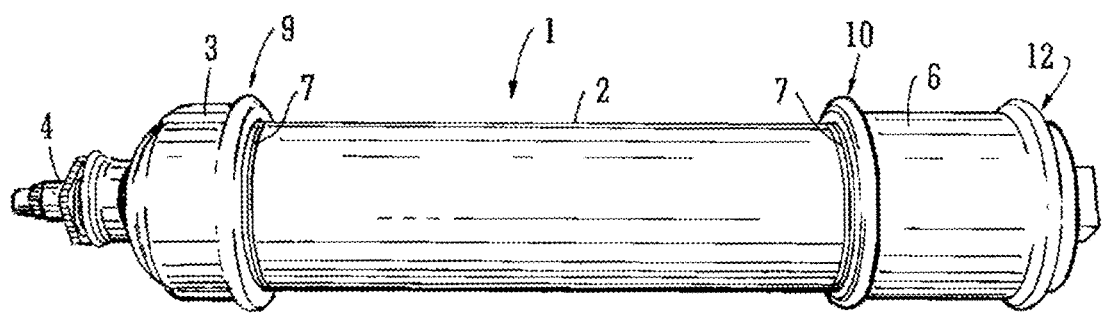
FIG. 1 is a drawing of a test assembly used in the Experimental section below.

Assemblies:

Assemblies were made up using new (unused) pipes and fittings cut according to EN 10242 having no visible defects. Recommended test parts are to ISO7-1 quality (and parts of this quality were used). The Test assembly 1 used is shown in FIG. 1 below and consists of a pressure connection 4, a 1.5"-0.5" (3.8 cm-1.3 cm) reducer, an equal barrel nipple 3, a 1.5" (3.8 cm) socket and a 1.5" (3.8 cm) stopper 6. Sockets employed generally have parallel threads 5 and tapered threaded stoppers.

Figure 2:
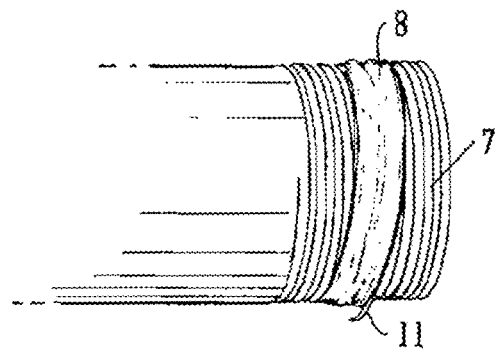
FIG. 2 is a drawing of a threaded pipe joint with the sealant material applied thereto as described in the Experimental section below.

The male threads 7 were roughened using a metal saw. The male and female threads 7 were cleaned using a steel brush. The Sealing Material made as set out above was applied to the male threads 7 of the test joints 9,10,12. One thread 11 was left in a visible position to allow assembly into the sockets. Five winds of the product were applied to the next thread and wound back over five threads 5, then wound forward to the start, and back again, applying in a "criss-cross" fashion as shown in FIG. 2 below. The thread was cut off and the trailing end of the product tucked into the nipple or stopper so that it is not hanging loose.

Three test assemblies with three test joints 9,10,12 each were assembled as shown in FIG. 1 using a torque wrench to apply an input torque of 150 Nm. Excess product was removed using a steel brush. The assemblies were allowed to cool to room temperature before testing. (Heat may be produced due to friction.)

EN751-2 Screening Test

The assemblies and in particular the joints thereof were then tested according to Standard EN751-2 Screening Test as follows.

An appropriate connector was attached to the open end of the test assembly and connected to an air pressure source.

The test assembly was pressurised to 7.5 bar±3 bar (0.75 MPa±0.3 MPa) with air or nitrogen.

The assembly was immersed in a water bath (room temperature) and inspected for leakage. Leakage is determined by the appearance of bubbles during the immersion period, ignoring those noted during the first 15 seconds of immersion.

Joints 9 and 10 (see FIG. 1) were turned back by 45° and the assembly was again immersed and tested for leaks again as described above.

Three test assembly pieces each with three test joints were used and all three joints on at least one test piece had to pass the test in order for the result to be considered positive i.e. the seal in the joint remained intact. In many cases all three joints on all three test assemblies were considered to have passed this test.

Pressurised Water Resistance Testing

Once joint seal tested as above after instant seal, test assemblies were half filled with water, stoppered (at the pressure connector joint) and stored at temperatures and pressures set out in the Table below for 1 week. When cool the stopper is removed, test pieces were emptied, and joints were tested as under EN751-2 Screening Test above.

| Yarn | Coating | Instant Seal | Reworkability as defined by EN 752-1 | Resistance to Steam at 180 C., pressure of 10 bar | Resistance to Steam at 200 C., pressure of 17 bar |
|---|---|---|---|---|---|
| PA | LOCTITE® 55 | ✓ | ✓ | ✓ | ✓* |

*Intermittent - the exposure of the joint to the fluid was not continuous.

Chemical Resistance Testing

Three test assembles with three test joints each were half filled with said chemical, stoppered (at the pressure connector joint) and stored at quoted temperatures and corresponding pressures for 1 week. The stopper is then removed, test pieces were emptied, and joints were tested again tested as under Joint Seal testing.

| Chemical | Bio-diesel | Hydraulic oil | Motor Oil | Ethylene Glycol + H20 (50/50) | Propylene Glycol + H20 (50/50) |
|---|---|---|---|---|---|
| Temperature | RT | RT | RT | 180 C. (200 C.*) | 180 C. (200 C.*) |
| LOCTITE® 55 | ✓ | ✓ | ✓ | ✓ | ✓ |

*Intermittent - the exposure of the joint to the fluid was not continuous.

LOCTITE® 55 is a pipe sealant material; it is a coated nylon thread sealant product which is coated with a paste. It is made from a polyamide yarn with a paste made mainly from hydroxyl terminated PDMS. Hydroxyl terminated PDMS is known to oxidise at about 150° C. and so it has always been assumed in the field that this product would not be able to seal beyond 150° C. It was also expected that the coating and in particular the hydroxyl terminated PDMS component of the coating would 'wash off' in the presence of chemicals/organic and hydrocarbon fuels such as biodiesel and motor oil but as can be seen from the results above the product will seal without problem.

It is clear from the foregoing experimental work that the sealant materials of the present invention clearly provide unexpected advantages which have been carefully formulated for optimum properties.

The following are a list of the surprising properties found:

The experimental evidence confirms resistance to Propane-1.2-diol (e.g. $H_2O$ 50/50), corrosion inhibitors for example X100 Concentrate (Sentinel™ X100 Inhibitor); Sludge Remover for example petroleum jellies for example X400 Concentrate (Sentinel™ X400 Sludge Remover); Bio diesel; Fuel oil, Hydraulic oil (for example Mobil-Nuto™ H 46 ISO VG 46), Ethylene glycol, for example in a cooling mixture with $H_2O$, for example GM Antifreeze, Longlife mixed with water in a 50/50 mixture) The experimental also shows resistance to steam at temperatures of 180 degrees, 10 bar and intermittent temperatures of 200 deg, 16 bar.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A process for using a sealing material consisting of a plurality of yarns coated with a non-curable joint sealing composition to seal a joint in a pipe system, comprising the steps of:
    applying the sealing material to a surface of the joint and mating the sealing material-applied surface of the joint with another part to form the pipe system, and thereafter passing through the pipe system a fluid, wherein the fluid comprises at least two of:
        (a) corrosion inhibitor selected from the group consisting of diammonium dimolybdate and benzotriazole;
        (b) sludge remover;
        (c) alcohol selected from the group consisting of propane diol and ethylene glycol;
        (d) hydrocarbon selected from the group consisting of diesel, fuel oil and hydraulic oil; or
        (e) steam at a temperature of at least 180° C. and a pressure of at least 10 bar (1000 kPa),
    wherein the plurality of yarns is constructed from polyamide, and
    wherein the non-curable joint sealing composition comprises silicone oil and a filler selected from the group consisting of a mineral filler, a powdered polymer filler and chopped fibre filler material.

2. The process according to claim 1 wherein the fluid is at an elevated temperature.

3. The process according to claim 2 wherein the elevated temperature is at least about 150° C.

4. The process of claim 1 wherein the yarn is a multifilament yarn or a spun yarn.

5. A process for using a plurality of yarns together with a non-curable joint sealing composition in the manufacture of a sealing material for sealing a joint in a pipe system, comprising the steps of:
    applying the sealing material to a joint and mating the sealing material-applied joint with another part to form a pipe system, and thereafter passing through the pipe system a fluid, wherein the fluid comprises at least two of:
        (a) corrosion inhibitor selected from the group consisting of diammonium dimolybdate and benzotriazole;
        (b) sludge remover;
        (c) alcohol selected from the group consisting of propane diol and ethylene glycol;
        (d) hydrocarbon selected from the group consisting of diesel, fuel oil and hydraulic oil; or
        (e) steam at a temperature of at least 180° C. and a pressure of at least 10 bar (1000 kPa),
    wherein the plurality of yarns are constructed from polyamide, and
    wherein the non-curable joint sealing composition comprises silicone oil and a filler selected from the group consisting of a mineral filler, a powdered polymer filler and chopped fibre filler material.

6. A system through which a fluid passes, wherein the system comprises a pipe system in which there is at least one joint, the joint being sealed with a sealing material comprising a plurality of yarns coated with a non-curable joint sealing composition, and a fluid passing through the sealed joint, the fluid comprising at least two of:
    (a) corrosion inhibitor selected from the group consisting of diammonium dimolybdate and benzotriazole;
    (b) sludge remover;
    (c) alcohol selected from the group consisting of propane diol and ethylene glycol;
    (d) hydrocarbon selected from the group consisting of diesel, fuel oil and hydraulic oil; or
    (e) steam at a temperature of at least 180° C. and a pressure of at least 10 bar (1000 kPa),
    wherein the yarn is constructed from polyamide, and
    wherein the non-curable joint sealing composition comprises silicone oil and a filler selected from the group consisting of a mineral filler, a powdered polymer filler and chopped fibre filler material.

* * * * *